(12) United States Patent
Sawada

(10) Patent No.: US 9,397,334 B2
(45) Date of Patent: Jul. 19, 2016

(54) SI ALLOY POWDER FOR NEGATIVE ELECTRODE OF LITHIUM-ION SECONDARY CELL, AND METHOD FOR MANUFACTURING SAME

(75) Inventor: Toshiyuki Sawada, Himeji (JP)

(73) Assignee: Sanyo Special Steel Co., Ltd., Himeji-shi (JP)

(*) Notice: Subject to any disclaimer, the term of this patent is extended or adjusted under 35 U.S.C. 154(b) by 228 days.

(21) Appl. No.: 13/980,194

(22) PCT Filed: Jan. 16, 2012

(86) PCT No.: PCT/JP2012/050715
§ 371 (c)(1),
(2), (4) Date: Jul. 17, 2013

(87) PCT Pub. No.: WO2012/099056
PCT Pub. Date: Jul. 26, 2012

(65) Prior Publication Data
US 2013/0302691 A1  Nov. 14, 2013

(30) Foreign Application Priority Data
Jan. 17, 2011 (JP) ................................ 2011-006910

(51) Int. Cl.
*C22C 29/18* (2006.01)
*H01M 4/38* (2006.01)
*H01M 10/0525* (2010.01)

(52) U.S. Cl.
CPC ............... *H01M 4/386* (2013.01); *C22C 29/18* (2013.01); *H01M 10/0525* (2013.01)

(58) Field of Classification Search
None
See application file for complete search history.

(56) References Cited

U.S. PATENT DOCUMENTS 5,677,060 A * 10/1997 Terentieva ............ C04B 41/009
156/89.28
7,060,360 B2 * 6/2006 Eaton .................... C04B 41/009
416/241 B
2005/0031957 A1  2/2005 Christensen et al.

FOREIGN PATENT DOCUMENTS

| JP | 200193524 A | 4/2001 |
|---|---|---|
| JP | 2001297757 A | 10/2001 |
| JP | 200571771 A | 3/2005 |
| JP | 2007502004 A | 2/2007 |
| JP | 2007165300 A | 6/2007 |
| JP | 201238699 A | 2/2012 |

* cited by examiner

*Primary Examiner* — George Wyszomierski
*Assistant Examiner* — Ngoclan T Mai
(74) *Attorney, Agent, or Firm* — The Webb Law Firm

(57) ABSTRACT

There are provided a Si alloy powder for a lithium ion secondary battery negative electrode active material, which has a high discharge capacity and excellent cycle life, and a method for producing the same. The Si alloy powder of the present invention comprises a eutectic structure including a Si phase and a $CrSi_2$ phase, and the average value of thicknesses in a thin width direction in each phase of the Si phase and the $CrSi_2$ phase is 4 μm or less. This Si alloy powder is produced by quenching and solidifying a dissolution material which gives the composition of the Si alloy powder at a cooling rate of 100° C./s or more.

12 Claims, 3 Drawing Sheets

SI ALLOY POWDER FOR NEGATIVE ELECTRODE OF LITHIUM-ION SECONDARY CELL, AND METHOD FOR MANUFACTURING SAME

CROSS-REFERENCE TO RELATED APPLICATION

This application claims priority to Japanese Patent Application No. 2011-6910 filed on Jan. 17, 2011, the entire content of which is incorporated herein by reference.

TECHNICAL FIELD

The present invention relates to a Si alloy powder for a lithium ion secondary battery negative electrode, which is superior in discharge capacity and cycle life and has a fine structure, and to a method for producing the same.

BACKGROUND ART

Although a powder comprising a carbon material has been conventionally used in a negative electrode active material for a lithium secondary battery, the carbon material has a low theoretical capacity of 372 mAh/g and there is a limit on further increase of the capacity thereof. In contrast, in recent years, the application of a metallic material of which the theoretical capacity is higher than that of a carbon material, such as Sn, Al or Si, has been examined or put into practical use. Particularly, Si is a promising material, as it has a theoretical capacity of more than 4000 mAh/g. Using these metallic materials which substitute carbon as negative electrode active materials for a lithium secondary battery achieves a high capacity, but the problem is its short cycle life.

There have been proposed many methods of performing improvement against the problem by adding various elements to Si to make not a pure Si powder but a Si alloy powder to obtain a fine structure. For example, in Japanese Patent Laid-Open Publication No. 2001-297757 (Patent Literature 1), the amount of an element such as Co to be eutectic or the larger amount thereof to be hypereutectic is added and the resultant is solidified at a cooling rate of 100° C./s or more to obtain an alloy powder with the minor axis particle diameter of a Si phase of 5 µm or less. Cycle life is improved by using such a Si alloy powder having a fine Si phase. That is, the effect of suppressing the change of the volume of a fine SI phase during absorption/desorption of Li is obtained by generating a silicide which neither absorbs nor desorbs Li.

CITATION LIST

Patent Literature

[PTL 1] Japanese Patent Laid-Open Publication No. 2001-297757

SUMMARY OF THE INVENTION

It was, however, found that, when a eutectic alloy of a Si phase and a silicide is actually produced with various additional elements, a fine eutectic structure is not always obtained depending on the kinds of the additional elements. For example, FIG. 4 is a scanning electron micrograph showing a cross-sectional structure view of a Si—FeSi$_2$-based eutectic alloy, FIG. 5 is an optical micrograph showing a microstructure view of a eutectic alloy of Si—VSi$_2$, and, as illustrated in this figure, there is the problem of generating a large-size silicide or Si phase even in a eutectic alloy.

As a result of a detailed examination of near-eutectic compositions in various elements, the inventor has now found (1) conditions under which a fine structure is obtained, and arrived at the present invention. Further, in the process of the examination, the inventor has found (2) conditions under which further superior charge-discharge characteristics are given not only by merely controlling the size of a microstructure but also by controlling the structure of a silicide.

Accordingly, an object of the present invention is to provide a Si alloy powder for a lithium ion secondary battery negative electrode active material, which has a high discharge capacity and excellent cycle life, and a method for producing the same.

According to one embodiment of the present invention, there is provided a Si alloy powder for a lithium ion secondary battery negative electrode, comprising a eutectic structure including a Si phase and a CrSi$_2$ phase, wherein
  the average value of thicknesses in a thin width direction in each phase of the Si phase and the CrSi$_2$ phase is 4 µm or less.

According to another embodiment of the present invention, there is provided a method for producing a Si alloy powder for a lithium ion secondary battery negative electrode, comprising the step of quenching and solidifying a dissolution material which gives the composition of said Si alloy powder at a cooling rate of 100° C./s or more.

DESCRIPTION OF EMBODIMENTS

The present invention is explained in detail below. Unless otherwise specified, "%" as used herein means at %.

The Si alloy powder for a lithium ion secondary battery negative electrode according to the present invention comprises a eutectic structure including a Si phase and a CrSi$_2$ phase. The average value of thicknesses in a thin width direction in each phase of the Si phase and the CrSi$_2$ phase is 4 µm or less.

Figure 1:
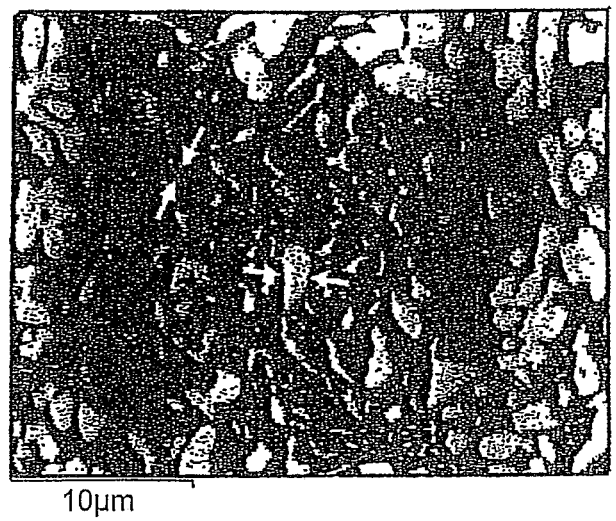
FIG. 1 is a scanning electron micrograph showing a cross-sectional structure view of a eutectic alloy of Si—CrSi$_2$ according to the present invention.

Thus, the first characteristic according to the present invention is in that Cr is used as an additional element for obtaining a eutectic alloy. FIG. 1 is a scanning electron micrograph showing a cross-sectional structure view of a eutectic alloy of Si—CrSi$_2$ according to the present invention, and the black phases are Si phases and the white phases are CrSi$_2$ phases. As shown in this FIG. 1, both Si phases and CrSi$_2$ phases are extremely fine and the average minor axis width thereof is 1 µm or less. In addition, the reasons why addition of Cr allows a eutectic structure to be extremely fine and provides superior charge-discharge characteristics, when compared to other elements such as Fe and V, are presumed as follows.

The content of an additional element necessary for obtaining a eutectic crystal of a Si phase and a silicide is determined depending on the kind of the element, and, for example, the addition of 26.5% is necessary in the case of Fe and the addition of 3% is necessary in the case of V. In addition, these can be read from a constitutional diagram of Si and an additional element. When the comparatively large amount of addition is necessary for obtaining a eutectic crystal as in the case of Fe, the amount of a silicide is inevitably increased to easily enlarge the size and the proportion of a Si phase which absorbs and desorbs Li is decreased, and thus fails to achieve a high discharge capacity.

In contrast, when a eutectic crystal is made by the extremely small amount of addition as in the case of V, the proportion of a silicide in a eutectic structure becomes low, and inevitably the size of a Si phase is easy to enlarge, so that the effect of suppressing the change of the volume of the Si phase during charge and discharge due to a silicide is not obtained. In contrast, the amount of Cr to be added to give a eutectic crystal lies between the above amounts, and a Si phase and a silicide both are considered to be fine. Accordingly, the Si—$CrSi_2$ eutectic alloy can have both of a high discharge capacity and excellent cycle life.

The second characteristic according to the present invention is in that charge-discharge characteristics can be further improved by partly substituting Cr with Ti. As a result of performing detailed examination of the substitution of Cr with Ti in a Si—$CrSi_2$ eutectic alloy, the inventor considered that Cr of $CrSi_2$ is substituted with Ti and the lattice constant of the alloy is increased without changing the crystal structure thereof.

Figure 2:
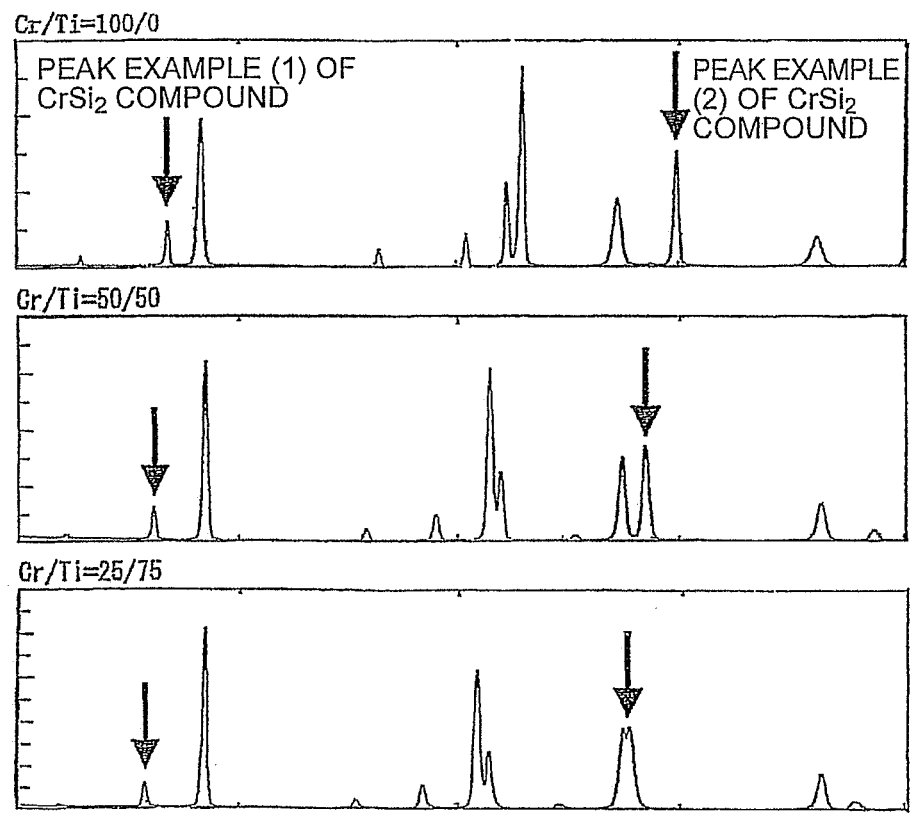
FIG. 2 is a view indicating the X-ray diffraction of a Si—CrSi$_2$ eutectic alloy with varying Cr/Ti ratios.

FIG. 2 is a view indicating the X-ray diffraction of a Si—$CrSi_2$ eutectic alloy with varying Cr/Ti ratios. As shown in this figure, it is considered that, by partly substituting Cr with Ti, the position of the diffraction peak shifts to a low angle side without changing the crystal structure of $CrSi_2$ and the lattice constant thereof is increased, Patent Literature 1 refers to the possibility that internal stress is also generated by the change of the volume of a silicide due to Li passing into the silicide and becomes a cause of deterioration in cycle life.

There is presumed the possibility that increase in the lattice constant of $CrSi_2$ due to the substitution of Cr with Ti according to the present invention plays the role of smoothing the passing of Li into a silicide and of reducing a volume change associated therewith. There have been few studies of venturing into a silicide structure in the examination of utilizing a eutectic alloy of Si and a silicide in a lithium ion battery negative electrode active material in such a manner.

Figure 3:
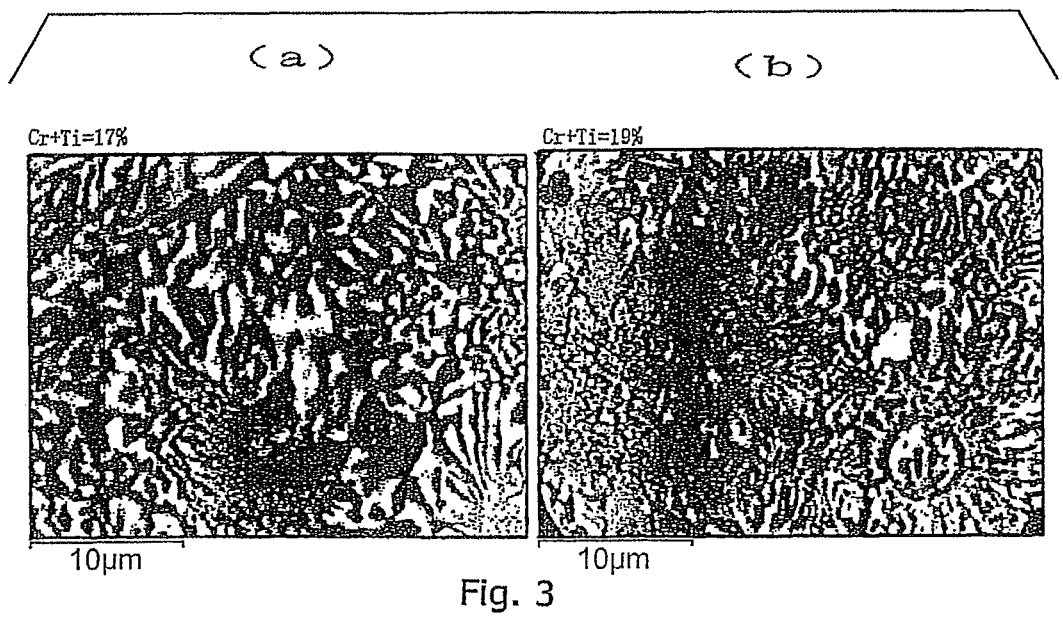
FIG. 3 shows scanning electron micrographs showing cross-sectional structure views of Si—CrSi$_2$-based eutectic alloys with varying total amounts of Cr and Ti.
Figure 4:
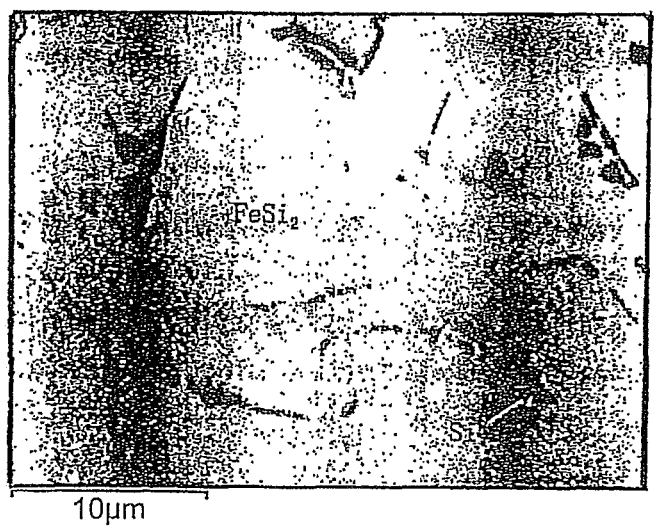
FIG. 4 is a scanning electron micrograph showing cross-sectional structure view of a Si—FeSi$_2$-based co-alloy.
Figure 5:
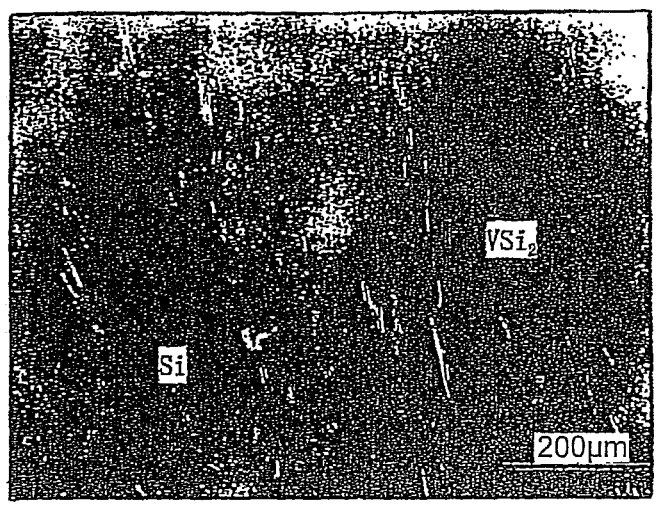
FIG. 5 is an optical micrograph showing a microstructure view of a eutectic alloy of Si—VSi$_2$.

Furthermore, it was found that the effect of partly substituting Cr with Ti has such an unexpected advantage as described below, although the detailed cause thereof is unknown. Since a normal eutectic composition is a specific composition in which the content of an additional element lies at a single point, a hypoeutectic or hypereutectic alloy is formed when the amount of additional element shifts even slightly from the specific composition and thus crystallizes a significantly large-size primary crystal. A high-level production technique is therefore required for strictly obtaining a eutectic structure. However, in the alloy according to the present invention, in which Cr is partly substituted with Ti, a fine structure is obtained in the wide range of around 16 to 21% in total of Cr and Ti, and the structure is not drastically changed even if the amount of additional element fluctuates to some extent depending on production lot. In addition, FIG. 3 shows scanning electron micrographs of cross-sectional structure views of Si—$CrSi_2$-based eutectic alloys with the varying total amounts of Cr and Ti. In addition, FIG. 3($a$) is in the case where the total amount of Cr and Ti is 17%, and FIG. 3($b$) is in the case where the total amount of Cr and Ti is 19%.

The third characteristic according to the present invention is in that Cr and/or Ti can be partly substituted with Al and/or Sn. Si of $CrSi_2$ is considered to be substituted with Al, and Al is presumed to increase the lattice constant of $CrSi_2$ as in the case of Ti. Accordingly, there is obtained an effect that is generally similar to the increase in the lattice constant of $CrSi_2$ by Ti.

Further, in the case of the addition of Al, Al was confirmed to remain also as an Al phase in part by X-ray diffraction. Since the ductility of this Al phase is greater than that of a Si phase or a $CrSi_2$ phase, the effect of alleviating particle decay due to volume change associated with charge and discharge is presumed to be also obtained. With regard to Sn, since Sn exists generally as a simple substance in alloy and the ductility of the phase thereof is also greater than that of a Si phase or a $CrSi_2$ phase as in the case of the Al phase, the effect of alleviating particle decay due to volume change associated with charge and discharge is presumed to be obtained.

In the present invention, each phase of the Si phase and the $CrSi_2$ phase has an average value of thicknesses in a thin width direction, of 4 μm or less, preferably 1 μm or less, more preferably 500 nm or less. In the alloy according to the present invention, the Si phase is a phase that absorbs and desorbs Li to contribute to charge and discharge and the $CrSi_2$ phase is a phase that suppresses volume change during charge and discharge to improve cycle life. These phases crystallize out as a complicated fine mixed structure as shown in FIG. 1 in the case of the eutectic alloy according to the present invention. When the average of the thicknesses in the thin width direction in both phases is more than 4 μm in this structure, the cycle life is deteriorated.

The Si phase according to the present invention is a phase that has a diamond structure containing Si as a main component and that absorbs and desorbs Li. Accordingly, a phase containing an additional element other than Si in solid solution is also encompassed. Further, the $CrSi_2$ phase according to the present invention is a phase that has a hexagonal structure and a space group belonging to $P6_222$ and that suppresses the change of the volume of the Si phase during charge and discharge. Accordingly, a phase of which a part is substituted with an additional element other than Cr and Si is encompassed.

According to a preferred embodiment of the present invention, the Si alloy powder comprises 16 to 21%, preferably 17 to 20%, more preferably 18 to 19%, in total of Cr and Ti, and has Cr %/(Cr %+Ti %) ranging from 0.15 to 1.00, preferably from 0.15 to 0.90, more preferably from 0.20 to 0.80. In the alloy according to the present invention, Cr is an essential element that generates $CrSi_2$ which forms a fine eutectic structure with a Si phase and Ti is an effective element with which Cr is substituted to increase the lattice constant of $CrSi_2$. The total amount of Cr and Ti of 16% or more can effectively avoid the generation of a hypoeutectic structure which leads to the crystallization of a large-size primary crystal Si phase while that of 21% or less can avoid the generation of a hypereutectic structure which leads to the crystallization of large-size $CrSi_2$, and in both cases cycle life is improved. When Cr %/(Cr %+Ti %) is 0.15 or more, the generation of a $TISi_2$ phase other than the $CrSi_2$ phase can be effectively avoided to improve cycle life without enlarging the size of the Si phase.

According to a preferred embodiment of the present invention, the Si alloy powder comprises 16 to 21%, preferably 17 to 20%, more preferably 18 to 19%, in total of Cr, Ti, Al and Sn, and has a ratio of Cr %/(Cr %+Ti %+Al %+Sn %) of 0.15 to 1.00, preferably 0.15 to 0.90, more preferably 0.20 to 0.80, and a ratio of (Al %+Sn %)/(Cr %+Ti %+Al %+Sn %) of 0.40 or less, preferably 0.03 to 0.30, more preferably 0.05 to 0.25. In the alloy according to the present invention, since Al is an effective element that is considered to increase the lattice constant of $CrSi_2$, as in the case of Ti, and also generates an Al phase, which can suppress particle decay due to volume change during charge and discharge, Cr or Ti can be substituted with Al. Furthermore, since Sn generates a Sn phase, which can suppress particle decay due to volume change during charge and discharge, Cr or Ti can be substituted with Sn. When Cr %/(Cr %+Ti %+Al %+Sn %) is 0.15 or more, the generation of a $TiSi_2$ phase other than the $CrSi_2$ phase can be effectively avoided and the enlargement of the size of the Si phase can be avoided to improve cycle life. When (Al %+Sn %)/(Cr %+Ti %+Al %+Sn %) is 0.40 or less, a fine structure can be effectively obtained and cycle life can be improved.

The Si alloy powder for a lithium ion secondary battery negative electrode according to the present invention can be produced by quenching and solidifying a dissolution material which gives the composition of the Si alloy powder of the present invention at a cooling rate of 100° C./s or more. The reason of conducting the solidification at the cooling rate of 100° C./s or more is because the alloy according to the present invention is a Si—$CrSi_2$-based eutectic alloy and the microstructure size of a eutectic alloy is generally affected by a cooling rate. Examples of methods for the solidification at the cooling rate of 100° C./s or more include a gas atomization method, a single-roll method and the like, and, in the step of producing the alloy according to the present invention, the production by the gas atomization method is preferred.

EXAMPLES

The present invention is specifically explained below with reference to Examples.

Si-based alloy powders with compositions shown in Table 1 were produced by a gas atomization apparatus. A base material in a melting amount of 1000 g was induction-melted in Ar atmosphere in an alumina-based fire-resistant crucible and the molten metal was tapped from a pore nozzle in the lower part of the crucible. Atomization was performed by spray gas just after the tapping. The resultant powders were classified into 63 μm or less, and the average value of thicknesses in a thin width direction in each phase and charge-discharge characteristics were evaluated by the following methods.

With regard to the average value of thicknesses in a thin width direction in each phase, a sample powder was embedded in resin and then polished, after that, in the polished cross section, the powder with a diameter of 40 μm or more was photographed at random with five Compo images by SEM at 4000-fold magnification. Five thickness values in a thin width direction of Si and $CrSi_2$ were read at random from one of the photographs, and the average value calculated from a total of 25 read values was regarded as the average value of thicknesses in a thin width direction in Si and $CrSi_2$ (which is described as an average minor axis width). In addition, although this powder has a complicated mixed structure as shown in FIG. 1, a thickness in a thin width direction in each phase is regarded as a minor axis width as shown by the arrows of FIG. 1.

In the photograph of the cross section of the powder, as for the shape of each phase, there are grains having spindle shapes and bar shapes, and many granular shapes which are non-uniform shapes are contained. In the case of a grain having a spindle or bar shape, the measurement of "thickness in a thin width direction in each phase" is easy. However, it is not easy in the case of the granular shapes which are non-uniform shapes. Thus, as for these granular shapes which are non-uniform shapes, respective grains were regarded as ellipses of which the major and minor diameters almost approximated each other and a length corresponding to the minor diameter in this case was evaluated as "thickness in a thin width direction in each phase."

In addition, some grains in which two or more spindle-shaped grains seem to be coupled are present in spots in the $CrSi_2$ phase which appears white in FIG. 1. The widths of portions corresponding to the minor diameters of these grains were measured and evaluated on the assumption that these grains were in the state of being separated into individual grains. In the Si phase which appears black in FIG. 1, there is a site where two or more layers are seen in a row because of being black, and the site was intended to be ineligible for measurement for convenience.

As for the charge-discharge characteristics, 10 mass % of polyvinylidene fluoride (binding material), 10 mass % of N-methylpyrrolidone (solvent), and 10 mass % of acetylene black (conductive material) were added to the sample powder, and the resultant was mixed in a mortar, to be in slurry form. This slurry was applied to copper foil (current collector), dried, and thereafter pressed by a hand pressing machine. Furthermore, this was stamped in a diameter of 10 mm, to obtain a negative electrode.

In a coin-type cell with this negative electrode, and counter and reference electrodes in which metal Li foil was used, the charge-discharge characteristics were evaluated. A mixture of ethylene carbonate with the same amount of dimethoxyethane was used as an electrolytic solution and $LiPF_6$ at a concentration of 1 mol was added as an electrolyte. Charge was performed to 0 V (vs. reference electrode) at a current value of 1/10 C, followed by discharging electricity to 2 V (vs. reference electrode) at 1/10 C. This was regarded as one cycle and was repeated for 50 cycles. The discharge capacity at the first cycle was evaluated as a discharge capacity, and a discharge capacity maintenance rate which is calculated by multiplying a value, obtained by dividing the discharge capacity at the 50th cycle by the discharge capacity at the first cycle, by 100(%) was evaluated as a life characteristic.

TABLE 1

| No. | Composition of Si-Based Powder (at %) | | | | | Cr %/ (Cr % + Ti %) | Cr %/ (Cr % + Ti % + Al % + Sn %) | (Al % + Sn %)/ (Cr % + Ti % + Al % + Sn %) | Si Average Minor Axis Width (μm) | $CrSi_2$ Average Minor Axis Width (μm) | Discharge Capacity (mAh/g) | Capacity Maintenance Rate (%) | |
|---|---|---|---|---|---|---|---|---|---|---|---|---|---|
| | Cr | Ti | Al | Sn | Si | | | | | | | | |
| 1 | 8.0 | 8.0 | 0 | 0 | Bal. | 0.50 | — | — | 1.0 | 1.3 | 1840 | 89 | Present |
| 2 | 8.5 | 8.5 | 0 | 0 | Bal. | 0.50 | — | — | 0.5 | 0.5 | 1700 | 95 | Invention |
| 3 | 9.5 | 9.5 | 0 | 0 | Bal. | 0.50 | — | — | 0.4 | 0.5 | 1450 | 95 | Examples |
| 4 | 10.5 | 10.5 | 0 | 0 | Bal. | 0.50 | — | — | 0.8 | 0.9 | 1330 | 92 | |

TABLE 1-continued

| | Composition of Si-Based Powder (at %) | | | | | Cr %/ (Cr % + Ti %) | Cr %/ (Cr % + Ti % + Al % + Sn %) | (Al % + Sn %)/ (Cr % + Ti % + Al % + Sn %) | Si Average Minor Axis Width (μm) | CrSi$_2$ Average Minor Axis Width (μm) | Discharge Capacity (mAh/g) | Capacity Maintenance Rate (%) | |
|---|---|---|---|---|---|---|---|---|---|---|---|---|---|
| No. | Cr | Ti | Al | Sn | Si | | | | | | | | |
| 5 | 17.0 | 0 | 0 | 0 | Bal. | 1.00 | — | — | 1.2 | 1.2 | 1690 | 82 | |
| 6 | 19.0 | 0 | 0 | 0 | Bal. | 1.00 | — | — | 1.0 | 1.1 | 1420 | 83 | |
| 7 | 13.5 | 4.5 | 0 | 0 | Bal. | 0.75 | — | — | 0.8 | 0.7 | 1580 | 95 | |
| 8 | 4.5 | 13.5 | 0 | 0 | Bal. | 0.25 | — | — | 0.9 | 0.9 | 1610 | 94 | |
| 9 | 2.7 | 15.3 | 0 | 0 | Bal. | 0.15 | — | — | 0.6 | 1.0 | 1600 | 91 | |
| 10 | 17.0 | 0 | 0 | 1.0 | Bal. | — | 0.94 | 0.06 | 1.6 | 1.3 | 1650 | 88 | |
| 11 | 9.0 | 6.0 | 4.0 | 0 | Bal. | — | 0.47 | 0.21 | 1.1 | 1.5 | 1700 | 97 | |
| 12 | 4.0 | 9.0 | 7.0 | 1.0 | Bal. | — | 0.19 | 0.38 | 1.4 | 1.7 | 1720 | 94 | |
| 13 | _7.5_ | _7.5_ | 0 | 0 | Bal. | 0.50 | — | — | _6.5_ | 1.0 | 1750 | 55 | Comparative Examples |
| 14 | _11.0_ | _11.0_ | 0 | 0 | Bal. | 0.50 | — | — | 1.1 | _7.0_ | 1050 | 74 | |
| 15 | 1.8 | 16.2 | 0 | 0 | Bal. | _0.10_ | — | — | _5.5_ | 0.9 | 1600 | 68 | |
| 16 | _14.0_ | _0_ | _0_ | 1.0 | Bal. | — | 0.93 | 0.07 | _6.0_ | 0.9 | 2000 | 44 | |
| 17 | _5.0_ | _9.0_ | _7.0_ | 1.0 | Bal. | — | 0.23 | 0.36 | 1.8 | _6.5_ | 1090 | 73 | |
| 18 | 3.0 | 10.0 | 8.0 | 0 | Bal. | — | _0.14_ | 0.38 | _6.5_ | 1.5 | 1740 | 60 | |
| 19 | 3.0 | 9.0 | 9.0 | 0 | Bal. | — | _0.14_ | _0.43_ | _10.0_ | 1.4 | 1830 | 61 | |

NOTE:
The underlined figures fall outside the scope of the present invention.

As shown in Table 1, Nos. 1 to 12 are present invention examples, while Nos. 13 to 19 are comparative examples.

Comparative Example No. 13 shown in Table 1 results in a poor capacity maintenance rate due to the small total amount of Cr and Ti and a high Si average minor axis width. Comparative Example No. 14 results in a low capacity maintenance rate due to the large total amount of Cr and Ti and a high CrSi$_2$ average minor axis width. Comparative Example No. 15 results in a low capacity maintenance rate due to a low ratio of Cr % (Cr %+Ti %) and a high Si average minor axis width. Comparative Example No. 16 results in a poor capacity maintenance rate due to the small total amount of Cr, Ti, Al and Sn and a high Si average minor axis width.

Comparative Example No. 17 results in a low capacity maintenance rate due to the large total amount of Cr, Ti, Al and Sn and a high CrSi$_2$ average minor axis width. Comparative Example No. 18 results in a low capacity maintenance rate due to a low ratio of Cr %/(Cr %+Ti %+Al %+Sn %) and a high Si average minor axis width. Comparative Example No. 19 results in a low capacity maintenance rate due to a low ratio of Cr %/(Cr %+Ti %+Al %+Sn %), a high ratio of (Al %+Sn %)/(Cr %+Ti %+Al %+Sn %), and a high Si average minor axis width.

In contrast, Present Invention Example Nos. 1 to 4 and Nos. 7 to 9 satisfy the requirements of the total amount of Cr and Ti and a ratio of Cr %/(Cr %+Ti %). Further, Present Invention Example Nos. 5 to 6 satisfy the requirement of a ratio of Cr %/(Cr %+Ti %) and the requirements of a Si average minor axis width and a CrSi$_2$ average minor axis width. Further, Present Invention Example Nos. 10 to 12 satisfy the requirements of the total amount of Cr, Ti, Al and Sn and ratios of Cr %/(Cr %+Ti %+Al %+Sn %) and (Al %+Sn %)/(Cr %+Ti %+Al %+Sn %) and was thus found to all show high values of a discharge capacity and a capacity maintenance rate.

As described above, the eutectic structure including a Si phase and a CrSi$_2$ phase according to the present invention is extremely fine and has the average value of thicknesses in a thin width direction, of 4 μm or less, as well as both of a high discharge capacity and excellent cycle life, in which charge characteristics can be further improved by partly substituting Cr with Ti. In addition, further substitution with Al or Sn provides the eutectic structure with a significantly superior effect of, for example, alleviating particle decay due to volume change associated with charge and discharge to extend cycle life.

The invention claimed is:

1. A Si alloy powder for a lithium ion secondary battery negative electrode, comprising a eutectic structure including a Si phase and a CrSi$_2$ phase, wherein
   the average value of thicknesses in a thin width direction in each phase of the Si phase and the CrSi$_2$ phase is 4 μm or less,
   the Si alloy powder comprising, in at %, 16 to 21% in total of Cr and Ti, wherein a ratio of Cr % /(Cr % +Ti %) is 0.15 to 1.00.

2. The Si alloy powder according to claim 1, wherein a ratio of Cr % /(Cr % +Ti %) is 0.15 to 0.90.

3. The Si alloy powder according to claim 2, consisting of, in at %, Cr, Ti, and the balance of Si and unavoidable impurities.

4. The Si alloy powder according to claim 1, consisting of, in at %, Cr, Ti, and the balance of Si and unavoidable impurities.

5. A Si alloy powder for a lithium ion secondary battery negative electrode, comprising a eutectic structure including a Si phase and a CrSi$_2$ phase, wherein
   the average value of thicknesses in a thin width direction in each phase of the Si phase and the CrSi$_2$ phase is 4 μm or less,
   the Si alloy powder comprising 16 to 21% in total of Cr, Ti, Al, and Sn, wherein a ratio of Cr % /(Cr % +Ti % +Al % +Sn %) is 0.15 to 1.00 and a ratio of (Al % +Sn %)/(Cr % +Ti % +Al % +Sn %) is 0.40 or less.

6. The Si alloy powder according to claim 5, wherein a ratio of Cr % /(Cr % +Ti % +Al % +Sn %) is 0.15 to 0.90.

7. The Si alloy powder according to claim 6, wherein a ratio of (Al % +Sn %)/(Cr % +Ti % +Al % +Sn %) is 0.03 to 0.30.

8. The Si alloy powder according to claim 7, consisting of Cr, Ti, Al, Sn, and the balance of Si and unavoidable impurities.

9. The Si alloy powder according to claim 6, consisting of Cr, Ti, Al, Sn, and the balance of Si and unavoidable impurities.

10. The Si alloy powder according to claim 5, wherein a ratio of (Al % +Sn %)/(Cr % +Ti % +Al % +Sn %) is 0.03 to 0.30.

11. The Si alloy powder according to claim 10, consisting of Cr, Ti, Al, Sn, and the balance of Si and unavoidable impurities.

12. The Si alloy powder according to claim 5, consisting of Cr, Ti, Al, Sn, and the balance of Si and unavoidable impurities.

* * * * *